United States Patent
Yokota (10) Patent No.: US 10,284,478 B2
(45) Date of Patent: May 7, 2019

(54) PACKET PROCESSING DEVICE, PACKET PROCESSING METHOD AND PROGRAM

(71) Applicant: NEC Corporation, Tokyo (JP)

(72) Inventor: Tomohisa Yokota, Tokyo (JP)

(73) Assignee: NEC Corporation, Tokyo (JP)

(*) Notice: Subject to any disclaimer, the term of this patent is extended or adjusted under 35 U.S.C. 154(b) by 142 days.

(21) Appl. No.: 15/122,133

(22) PCT Filed: Mar. 3, 2015

(86) PCT No.: PCT/JP2015/056143
§ 371 (c)(1),
(2) Date: Aug. 26, 2016

(87) PCT Pub. No.: WO2015/133448
PCT Pub. Date: Sep. 11, 2015

(65) Prior Publication Data
US 2016/0373364 A1 Dec. 22, 2016

(30) Foreign Application Priority Data
Mar. 4, 2014 (JP) ................................ 2014-041624

(51) Int. Cl.
*H04L 12/851* (2013.01)
*H04L 12/64* (2006.01)
(Continued)

(52) U.S. Cl.
CPC ...... *H04L 47/2483* (2013.01); *H04L 12/6418* (2013.01); *H04L 47/20* (2013.01); *H04L 49/901* (2013.01)

(58) Field of Classification Search
None
See application file for complete search history.

(56) References Cited

U.S. PATENT DOCUMENTS 6,141,749 A  10/2000 Coss et al.
2005/0125424 A1* 6/2005 Herriott .................. H04L 69/22

FOREIGN PATENT DOCUMENTS

EP         909072 A2    4/1999
JP    H10-243028 A     9/1998
(Continued)

OTHER PUBLICATIONS

Extended European Search Report issued in European Patent Application No. 15757950.9, dated Sep. 25, 2017, 6 pages.
(Continued)

*Primary Examiner* — Alex Skripnikov
(74) *Attorney, Agent, or Firm* — Wilmer Cutler Pickering Hale and Dorr LLP (57) ABSTRACT

A packet processing device includes: a storage unit that holds an action table including actions that define processing contents of packets and a rule table including rules to search for actions to be applied to packets; a rule control unit that updates rules included in the rule table; and a packet processing unit that searches the action table for an action to be applied to a received packet using the rule table, processes the packet in accordance with the searched action, and accumulates a pointer with respect to the searched action, wherein the packet processing unit determines whether the rule table has been updated by the rule control unit after accumulation of the pointer and, if not updated, extracts an action to be applied to a received packet from the action table in accordance with the accumulated pointer.

12 Claims, 5 Drawing Sheets

(51) Int. Cl.
   *H04L 12/813* (2013.01)
   *H04L 12/879* (2013.01)

(56) References Cited

FOREIGN PATENT DOCUMENTS

| JP | H11-163940 A | 6/1999 |
|---|---|---|
| JP | 2000-089957 A | 3/2000 |
| WO | WO-2012/105677 | 8/2012 |

OTHER PUBLICATIONS

Arthur Azevedo de Amorim, et al: A Verified Information-flow Architecture, PLDI09: Proceedings of the 2009 ACM SIGPLAN Conference on Programming Language Design and Implementation, XP058037335, vol. 49, No. 1, Jan. 8, 2014, pp. 165-178 (14 pages).

Minlan Yu, et al: "Scalable Flow-based Networking with DIFANE", Proceedings of the ACM SIGCOMM 2010 Conference on Applications, Technologies, Architectures, and Protocols for Computer Communications, New Delhi, India, XP058189957, Aug. 30-Sep. 3, 2010, pp. 351-362 (12 pages).

Andreas Voellmy, et al: "Maple", SIGCOMM, ACM, 2 Penn Plaza, Suite 701, New York, NY 10121-0701, USA, XP058030647, Aug. 27, 2013, pp. 87-98 (12 pages).

Japanese Office Action issued by the Japan Patent Office for Japanese Application No. 2016-506487 dated Aug. 29, 2017 (4 pages).

International Search Report corresponding to PCT/JP2015/056143 dated Jun. 2, 2015 (one page).

Nick McKeown et al., "OpenFlow: Enabling Innovation in Campus Networks," Mar. 14, 2008 (6 pages), searched online Feb. 24, 2014 at <URL:http://www.openflow.org/documents/openflow-wp-lates.pdf>.

OpenFlow Switch Specification, Version 1.3.1, Open Networking Foundation, Sep. 6, 2012 (128 pages), searched online Feb. 24, 2014 at <URL:https://www.opennetworking.org/images/stories/downloads/specification/openflow-spec-v1.3.pdf>.

* cited by examiner

PACKET PROCESSING DEVICE, PACKET PROCESSING METHOD AND PROGRAM

CROSS-REFERENCE TO RELATED APPLICATION

This application is a national stage application of International Application No. PCT/JP2015/056143 entitled "Packet Processing Device, Packet Processing Method and Program" filed on Mar. 3, 2015, which claims priority to Japanese Patent Application No. 2014-041624, filed on Mar. 4, 2014, the disclosure of which is incorporated herein in its entirety by reference thereto.

The present invention relates to a packet processing device, a packet processing method and a program, and particularly, relates to a packet processing device, a packet processing method and a program in a centralized-control-type network.

TECHNICAL FIELD

Background Art

In a packet processing device such as a switch provided in a communication system, a packet processing unit has been more often implemented by software in recent years. In particular, due to the increase in the performance of a general-purpose processor and the trend toward the Network Functions Virtualization (NFV) and the Software-Defined Networking (SDN), there is an increasing need for the implementation of a packet processing unit by software. In addition, in performing packet processing based on software processing, it is required to satisfy a processing performance that is equivalent to hardware processing.

As a technology for implementing a centralized-control-type network based on the NFV or the SDN, for example, NPLs 1 and 2 describe OpenFlow. OpenFlow recognizes communications as end-to-end flows and performs path control, failure recovery, load balancing, and optimization on a per-flow basis. An OpenFlow switch (OFS) specified in NPL 2 has a secure channel for communication with an OpenFlow controller (OFC) and operates according to a flow table suitably added or rewritten by the OFC. In the flow table, a set of: matching conditions (Match Fields) against which a packet header is matched; flow statistical information (Counters); and instructions that define processing contents is defined for each flow (see section "5.2 Flow Table" in NPL 2).

Upon receipt of a packet, the OFS searches the flow table for an entry having a matching condition (see "5.3 Matching" in NPL 2) that matches header information of the received packet. If an entry matching the received packet is found as a result of search, the OFS updates the flow statistical information (Counters) and executes a processing content (e.g., packet transmission from a specified port, flooding, or dropping) written in the instructions field of the entry with respect to the received packet. Meanwhile, if an entry matching the received packet is not found as a result of search, the OFS transmits an entry setting request, that is, a request for transmission of control information (Packet-In message) for processing the received packet via the secure channel to the OFC. The OFS receives a flow entry defining a processing content and updates the flow table. In this manner, the OFS performs packet transfer using an entry stored in the flow table as control information.

CITATION LIST

Non Patent Literature

NPL 1: Nick McKeown, and seven others, "OpenFlow: Enabling Innovation in Campus Networks", [online], [searched on Feb. 24, 2014], Internet <URL:http://www.openflow.org/documents/openflow-wp-latest.pdf>

NPL 2: "OpenFlow Switch Specification" Version 1.3.1 (Wire Protocol 0x04), [online], [searched on Feb. 24, 2014], Internet <URL:https://www.opennetworking.org/images/stories/downloads/specification/openflow-spec-v1.3.1.pdf>

SUMMARY OF INVENTION

Technical Problem

The disclosure of the above NPLs is incorporated herein in its entirety by reference thereto. The following analysis has been given by the present inventor.

As described above, due to the increase in the performance of the general-purpose processor and the trend toward the Network Functions Virtualization (NFV) and the Software-Defined Networking (SDN), there are increasing opportunities for the implementation of a packet processing unit by software.

However, it is known that implementing a packet processing unit by software generally lowers the processing speed compared with hardware processing. In particular, when performing rule search at a time of packet processing by software, it takes a long time for search processing, excluding some search methods such as exact match search, compared with hardware processing. In addition, there are many cases in which longest match search, mask search, and field-specified search are necessary, and in these cases, software search lowers the processing speed compared with hardware search.

As a related art for increasing the speed of packet processing based on software, a method using a flow cache table has been invented. The flow cache table is a table for holding a plurality of times of rule search necessary for each packet as a cache. Using the flow cache table makes it possible to acquire results of a plurality of times of rule search collectively by a single search as to which flow a packet belongs to.

By the way, the flow cache table in the above related art is created and managed by a process, such as a rule control unit, which is separate from a packet processing unit. According to the technology, when the packet processing unit accesses the flow cache table, there arises a need for performing mutual exclusion between the packet processing unit and the rule control unit. Consequently, when the packet processing unit accesses the flow cache table, standby time is generated due to the mutual exclusion, causing a problem in which packet processing takes time.

Accordingly, a problem to be addressed is to increase the speed of packet processing by a packet processing unit implemented by software. An objective of the present invention is to provide a packet processing device, a packet processing method and a program that contribute to solving the problem.

Solution to Problem

A first aspect of the present invention provides a packet processing device. The packet processing device includes: a storage unit that holds an action table including actions that define processing contents of packets and a rule table including rules to search for actions to be applied to packets; a rule control unit that updates rules included in the rule table; and a packet processing unit that searches the action table for an action to be applied to a received packet using the rule table, processes the packet in accordance with the searched action, and accumulates a pointer with respect to the searched action, wherein the packet processing unit determines whether the rule table has been updated by the rule control unit after accumulation of the pointer and, if not updated, extracts an action to be applied to a received packet from the action table in accordance with the accumulated pointer.

A second aspect of the present invention provides a packet processing method. The packet processing method includes: by a computer, holding, in a storage unit, an action table including actions that define processing contents of packets and a rule table including rules to search for actions to be applied to packets; updating rules included in the rule table by a first process; searching, by a second process, the action table for an action to be applied to a received packet using the rule table, processing the packet in accordance with the searched action, and accumulating a pointer with respect to the searched action; and determining, by the second process, whether the rule table has been updated by the first process after accumulation of the pointer and, if not updated, extracting an action to be applied to a received packet from the action table in accordance with the accumulated pointer.

A third mode of the present invention provides a program. The program causes a computer to execute the processing of: holding, in a storage unit, an action table including actions that define processing contents of packets and a rule table including rules to search for actions to be applied to packets; updating rules included in the rule table by a first process; searching, by a second process, the action table for an action to be applied to a received packet using the rule table, processing the packet in accordance with the searched action, and accumulating a pointer with respect to the searched action; and determining, by the second process, whether the rule table has been updated by the first process after accumulation of the pointer and, if not updated, extracting an action to be applied to a received packet from the action table in accordance with the accumulated pointer. It is to be noted that the program can also be provided as a program product recorded in a non-transitory computer-readable storage medium.

Advantageous Effects of Invention

A packet processing device, a packet processing method and a program according to the present invention enable to increase the speed of packet processing by a packet processing unit implemented by software.

DESCRIPTION OF EMBODIMENTS

First of all, the summary of an exemplary embodiment is described. It is to be noted that drawing reference numerals attached to this summary are examples to exclusively aid understanding and are not intended to limit the present invention to aspects illustrated in the drawings.

According to an exemplary embodiment, a lockless flow cache table is proposed. Implementing a flow cache table in a lockless manner in to addition to faster rule search by the flow cache table eliminates standby time at a time of accessing the flow cache table and increases the speed of packet processing.

As a means for achieving a lockless flow cache table, a packet processing unit creates and manages a flow cache table. In addition, the packet processing unit performs processing for synchronizing the flow cache table with a rule table, thereby eliminating the need for access to the flow cache table by a rule control unit and achieving the lockless flow cache table.

Figure 1:
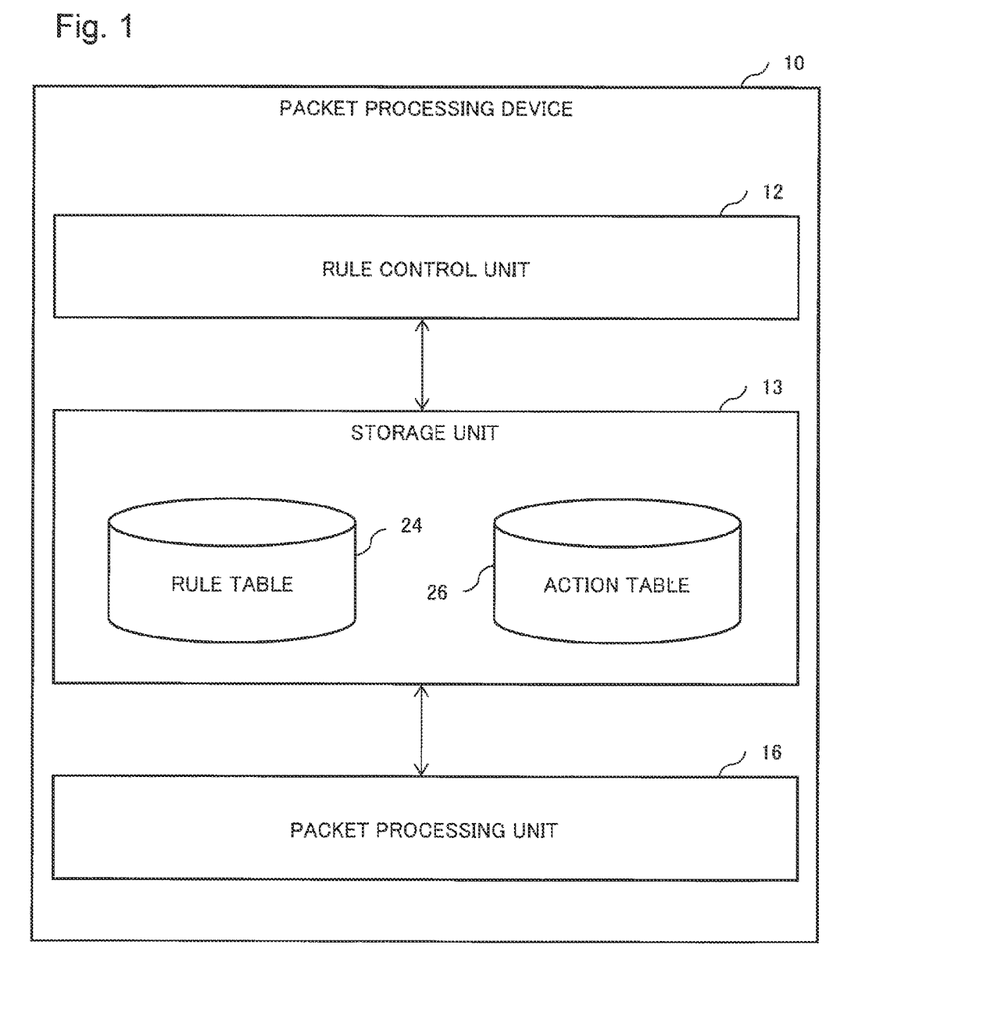
FIG. 1 is a block diagram illustrating an example configuration of a packet processing device according to an exemplary embodiment.

FIG. 1 is a block diagram illustrating an example configuration of a packet processing device according to an exemplary embodiment. Referring to FIG. 1, a packet processing device 10 includes a storage unit 13 that holds an action table 26 including actions that define processing contents of packets and a rule table 24 including rules to search for actions to be applied to packets, a rule control unit 12 that updates rules included in the rule table 24, and a packet processing unit 16 that searches the action table 26 for an action to be applied to a received packet using the rule table 24, processes the packet in accordance with the searched action, and accumulates a pointer with respect to the searched action. The packet processing unit 16 determines whether the rule table 24 has been updated by the rule control unit 12 after accumulation of the pointer and, if not updated, extracts an action to be applied to a received packet from the action table 26 in accordance with the accumulated pointer.

In this manner, the packet processing unit 16 rather than the rule control unit 12 accumulates a pointer with respect to an action searched by the own unit, thereby eliminating the need for mutual exclusion between the rule control unit 12 and the packet processing unit 16. Consequently, it becomes possible to increase the speed of packet processing in the case of implementing the packet processing unit 16 by software.

In order that the packet processing unit 16 determines whether the rule table 24 has been updated by the rule control unit 12 after accumulation of the pointer, for example, the following configuration can be adopted.

Figure 2:
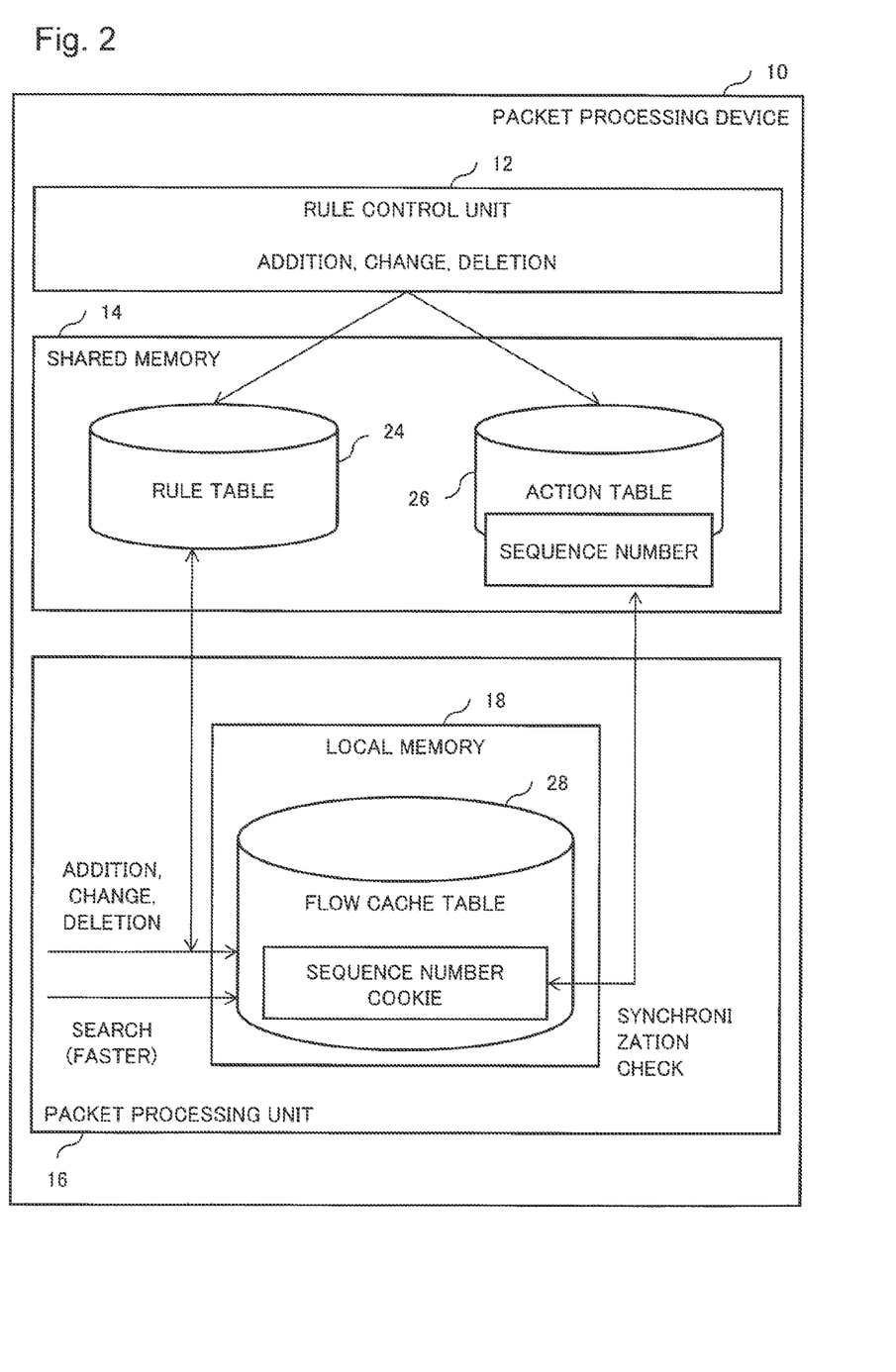
FIG. 2 is a block diagram illustrating an example configuration of a packet processing device according to a first exemplary embodiment.

Referring to FIG. 2, the rule control unit 12 records, when updating rules included in the rule table 24, an identifier (e.g., a sequence number) for identifying the update in the storage unit (e.g., in the action table 26 held by a shared memory 14), and the packet processing unit 16 holds, when accumulating the pointer, an identifier recorded in the storage unit (shared memory 14). The packet processing unit 16 compares the held identifier with the identifier recorded in the storage unit (shared memory 14) by the rule control unit 12, and thereby determines whether the rule table 24 has been updated by the rule control unit 12 after accumulation of the pointer.

More specifically, the rule control unit 12 updates, at a time of update (e.g., addition, change, or deletion) of an entry, a sequence number within the entry in the action table 26. When creating a flow cache table 28, the packet processing unit 16 caches, as a cookie, a sequence number within an entry in the action table 26 in addition to caching a pointer into the action table 26. The packet processing unit 16, when searching the flow cache table 28 and, in the case of hit, referring to an action entry in accordance with the pointer to the action table 26 registered in the flow cache table 28, compares the cookie of the sequence number cached within the flow cache table 28 with the current sequence number registered in the action table 26. If the both match each other, the packet processing unit 16 determines that there is no change in the action table 26 from a previous time and continues packet processing. Meanwhile, if the both do not match each other, the packet processing unit 16 determines that the action table 26 has been changed and determines that the flow cache entry is invalid. At this time, the packet processing unit 16 performs search of the rule table 24, reference to the action table 26, and registration in the flow cache table 28 to create a new flow cache entry.

This configuration enables the implementation of the flow cache table 28 in a lockless manner in addition to faster rule search by the flow cache table 28, thereby making it possible to eliminate standby time at a time of accessing the flow cache table 28 by the packet processing unit 16 and increase the speed of packet processing in the case of implementing the packet processing unit 16 by software.

Exemplary Embodiment 1

Next, a packet processing device according to a first exemplary embodiment is described with reference to the drawings. FIG. 2 is a block diagram illustrating an example of a configuration of a packet processing device 10 according to the present exemplary embodiment.

Referring to FIG. 2, the packet processing device 10 includes a rule control unit 12, a shared memory 14, and a packet processing unit 16. The shared memory 14 holds a rule table 24 and an action table 26. The packet processing unit 16 includes a local memory 18 and holds a flow cache table 28 on the local memory 18.

In the present exemplary embodiment, in the case of hit in the search of the rule table 24, information on a pointer to the action table 26 obtained as a result thereof is registered in the local flow cache table 28 within the packet processing unit 16. Search for subsequent packets belonging to the same flow is performed by searching the flow cache table 28 while bypassing the search of the rule table 24 by the packet processing unit 16, thereby increasing the speed of search processing.

The rule control unit 12 performs management such as addition, change, or deletion with respect to the action table 26 used in packet processing and the rule table 24 used for searching the action table 26. The action table 26 and the rule table 24 are necessary to be accessed from both the rule control unit 12 and the packet processing unit 16, and thus are implemented in the shared memory 14.

Upon receipt of a packet, the packet processing unit 16 firstly searches the rule table 24. Next, the packet processing unit 16 refers to a corresponding action entry within the action table 26 in accordance with a pointer obtained as a result of search, and performs packet processing in accordance with the action entry.

Processing for subsequent packets belonging to the same flow can be performed with the same action entry. Thus, the packet processing unit 16 registers a flow cache entry having flow information as a key in the flow cache table 28 on the local memory within the packet processing unit 16 after packet processing. This enables faster action entry search by the packet processing unit 16.

In addition, it is necessary to establish synchronization between the flow cache table 28 created by the packet processing unit 16 and the rule table 24. To establish synchronization, the present exemplary embodiment adopts the following method.

When performing update (e.g., addition, change, or deletion) with respect to the rule table 24, the rule control unit 12 registers a sequence number in the action table 26. The sequence number herein refers to information indicating that information in the action table has been rewritten at a time of updating the action table. As an example of the sequence number, an overflow-free value (e.g., a time stamp value) can be used. It is to be noted that a sequence number in the present invention is not limited to the time stamp value.

When creating the flow cache table 28, the packet processing unit 16 caches a sequence number within the action table 26 as cookie information, and registers the cookie information in the flow cache table 28.

When searching the flow cache table 28 and referring to the action table 26, the packet processing unit 16 compares the cookie information of the sequence number within the flow cache table 28 with the current sequence number within the action table 26. If the both match each other, the packet processing unit 16 determines that the rule table 24 has not been updated from a previous time and the flow cache table 28 is valid, and continues processing.

Meanwhile, if the both do not match each other, the packet processing unit 16 determines that the rule table 24 has been updated by the rule control unit 12 after a point in time of creating a flow cache entry by a previous reference, and determines that the entry in the flow cache table 28 is invalid. In this case, the packet processing unit 16 sets an invalid flag to ON with respect to the entry in the flow cache table 28. In addition, the packet processing unit 16 having set the invalid flag to ON searches the rule table 24 and refers to the action table 26 to create a new flow cache entry. At this time, if a search hit occurs, the packet processing unit 16 processes the packet in accordance with the hit entry. In addition, the packet processing unit 16 registers the new entry in the flow cache table 28 after packet processing.

However, merely adopting this method may result in depletion of memory resources due to invalid entries remaining within the flow cache table 28. Thus, the packet processing unit 16 searches the flow cache table 28 periodically and specifies an entry with its invalid flag ON. Upon specifying an entry with its invalid flag ON, the packet processing unit 16 deletes the entry. If the configuration of the table changes in deleting the entry from the flow cache table 28, the configuration of the table is also changed (for example, when a hash table is formed by a chain method, the chain is recombined).

Figure 3:
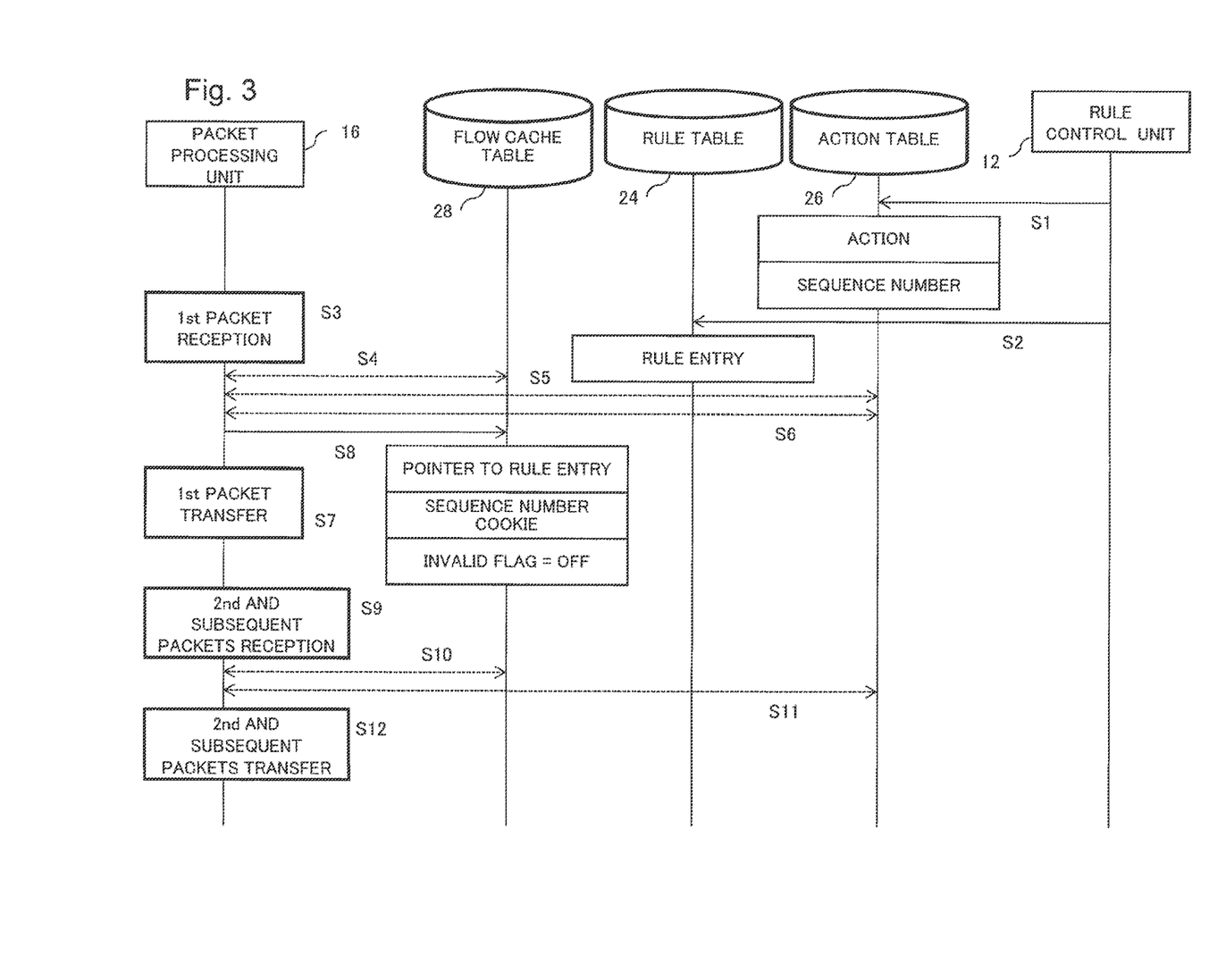
FIG. 3 is a sequence diagram illustrating an example operation of the packet processing device according to the first exemplary embodiment.
Figure 4:
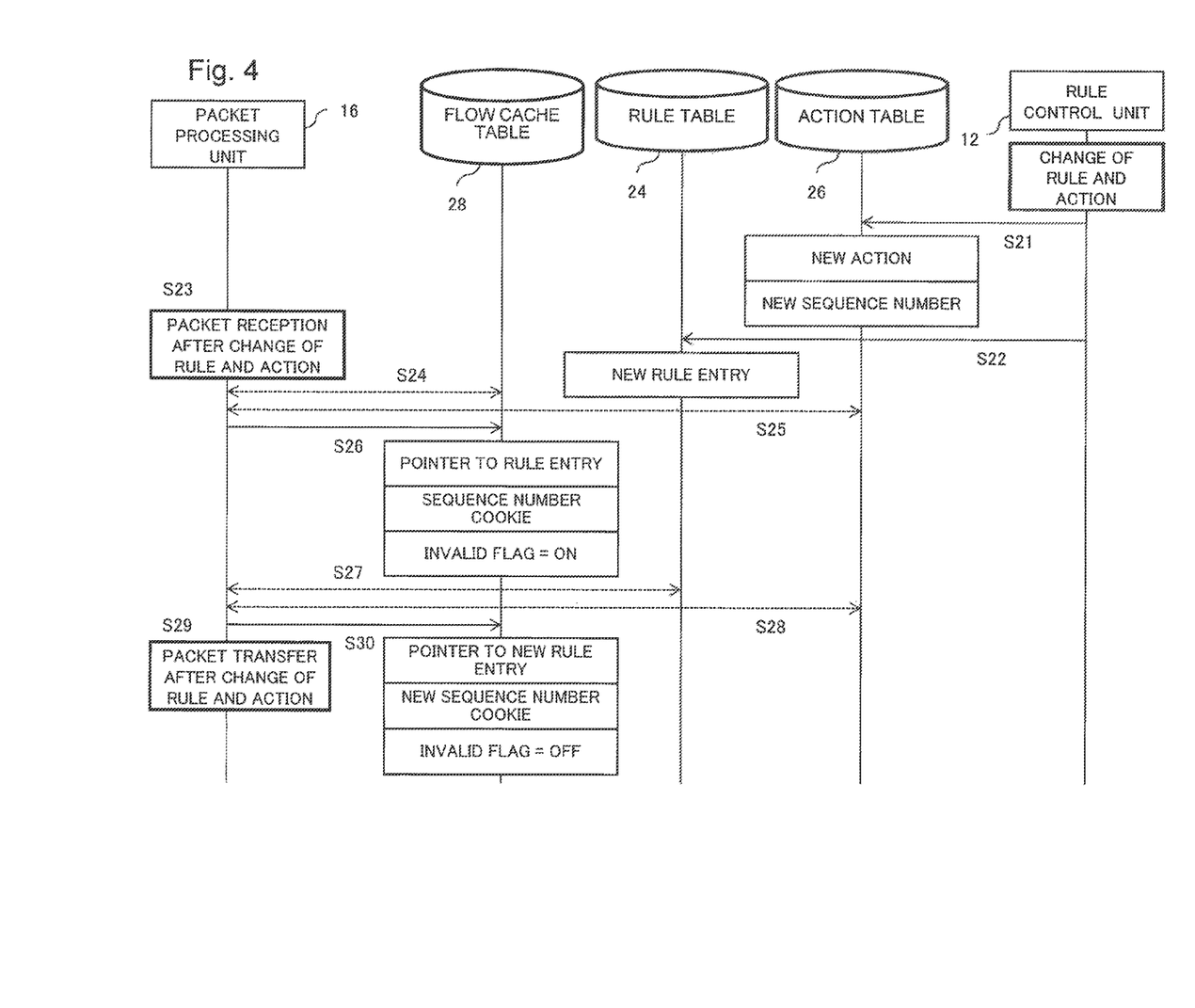
FIG. 4 is a sequence diagram illustrating an example operation of the packet processing device according to the first exemplary embodiment.
Figure 5:
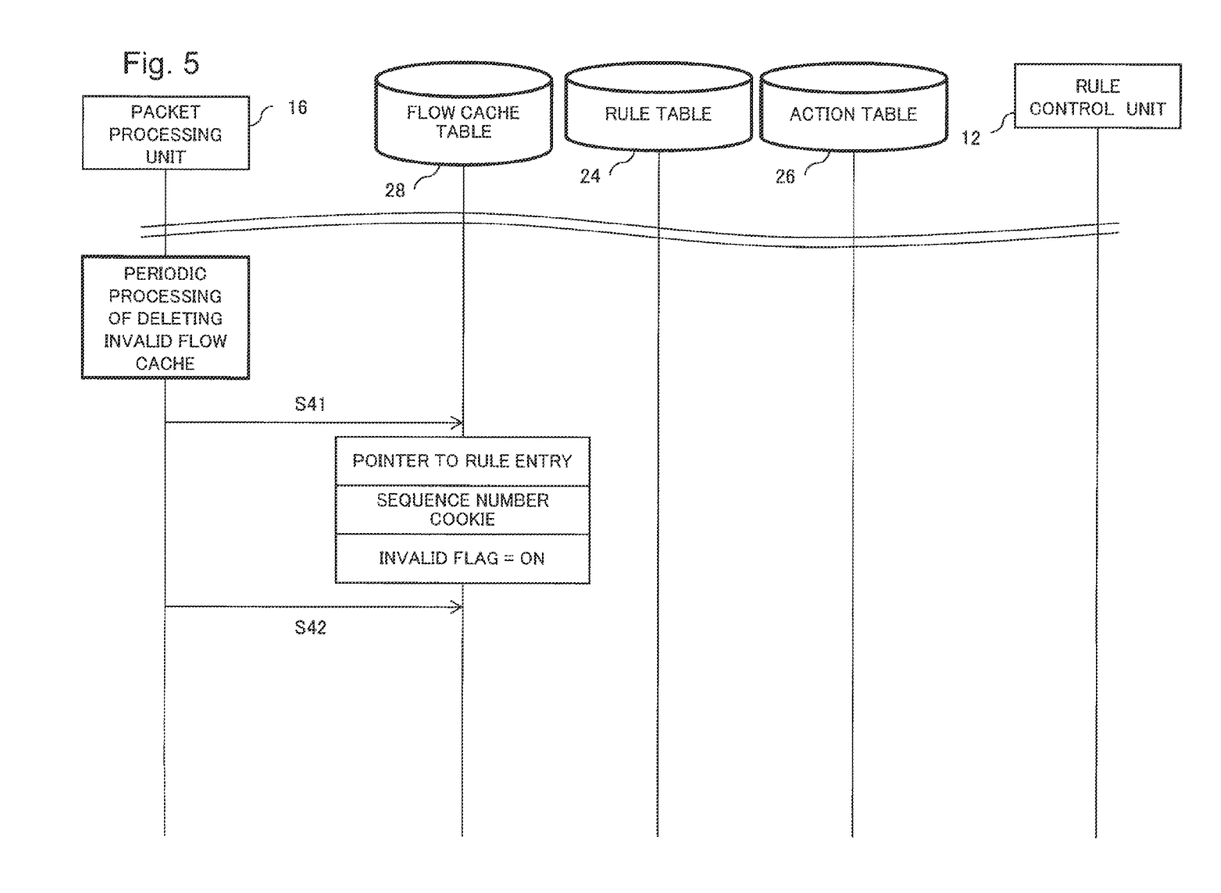
FIG. 5 is a sequence diagram illustrating an example operation of the packet processing device according to the first exemplary embodiment.

Next, with reference to the drawings, the operation of the packet processing device 10 according to the present exemplary embodiment is described. FIGS. 3 to 5 each illustrate a sequence diagram illustrating an example of the operation of the packet processing device 10.

FIG. 3 illustrates a sequence diagram illustrating an example operation of registering rules in the rule table 24 by the rule control unit 12 and processing a 1st packet and a 2nd packet belonging to the same flow by the packet processing unit 16.

Referring to FIG. 3, the rule control unit 12 performs update (e.g., addition, change, or deletion of a rule) with respect to the rule table 24 used for searching the action table 26 (Step S2). When performing addition, change, or deletion with respect to the rule table 24, the rule control unit 12 registers a sequence number in the action table 26 (Step S1).

If a packet received by the packet processing unit 16 is a first packet (Step S3), a flow cache entry corresponding to the packet has not registered in the flow cache table 28 (Step S4). Thus, the packet processing unit 16 searches the rule table 24 (Step S5). Next, the packet processing unit 16 refers to a corresponding action entry within the action table 26 in accordance with a pointer obtained as a result of search (Step S6), and processes the packet in accordance with the action entry (Step S7).

In addition, the packet processing unit 16 registers a flow cache entry having flow information as a key in the flow cache table 28 on the local memory within the packet processing unit 16 after packet processing (Step S8). The packet processing unit 16 may process the packet (Step S7) after registering the entry in the flow cache table (Step S8).

In addition, when creating the flow cache table 28, the packet processing unit 16 caches a sequence number within the action table 26 as cookie information, and registers the cookie information in the flow cache table 28. Further, the packet processing unit 16 sets an invalid flag to OFF with respect to the registered flow cache entry to indicate that the flow cache entry is valid.

Upon receipt of second and subsequent packets belonging to the same flow (Step S9), the packet processing unit 16 compares, when searching the flow cache table 28 (Step S10) and referring to the action table 26 (Step S11), the cookie information of the sequence number within the flow cache table 28 with the current sequence number within the action table 26. If the both match each other, the packet processing unit 16 determines that the rule table 24 has not been updated from a previous time and the flow cache table 28 is valid, and continues processing. That is, the packet processing unit 16 processes the packet based on the action entry within the action table 26 that has been obtained in accordance with the flow cache entry registered in the flow cache table 28 (Step S12).

FIG. 4 is a sequence diagram illustrating an example operation of the packet processing device 10 in the case of performing addition, change, or deletion with respect to the action table 26 and the rule table 24 by the rule control unit 12.

Referring to FIG. 4, the rule control unit 12 performs addition, change, or deletion with respect to the rule table 24 (Step S22). In addition, when performing addition, change, or deletion with respect to the rule table 24, the rule control unit 12 registers a new sequence number in the action table 26.

Upon receipt of a packet after rule change by the rule control unit 12 (Step S23), the packet processing unit 16 compares, when searching the flow cache table 28 (Step S24) and referring to the action table 26 (Step S25), the cookie information of the sequence number within the flow cache table 28 with the current sequence number within the action table 26. Since the latter sequence number has been updated to a new number by the rule control unit 12, the both do not match each other. Thus, the packet processing unit 16 determines that the rule table 24 has been updated by the rule control unit 12 after a point in time of creating a flow cache entry by a previous reference, and determines that the entry in the flow cache table 28 is invalid. In this case, the packet processing unit 16 sets an invalid flag to ON with respect to the entry in the flow cache table 28 (Step S26).

In addition, the packet processing unit 16 having set the invalid flag to ON searches the rule table 24 (Step S27) and refers to the action table 26 (Step S28) to create a new flow cache entry. At this time, if a search hit occurs, the packet processing unit 16 processes the packet in accordance with the hit entry (Step S29). In addition, the packet processing unit 16 registers the new entry in the flow cache table 28 after packet processing (Step S30). The packet processing unit 16 may process the packet (Step S29) after registering the entry in the flow cache table (Step S30)

FIG. 5 is a sequence diagram illustrating an example operation of deleting an invalid entry within the flow cache table 28. Referring to FIG. 5, the packet processing unit 16 searches the flow cache table 28 periodically and specifies an entry with its invalid flag ON (Step S41). Upon specifying an entry with its invalid flag ON, the packet processing unit 16 deletes the entry and updates the flow cache table 28 (Step S42).

Next, the effect of the packet processing device 10 according to the present exemplary embodiment is described. The search of the rule table 24 may occur a plurality of times depending on packet processing. The use of the flow cache table 28 enables to specify all actions by a single time of search of the flow cache table 28 while bypassing a plurality of times of search of the rule table 24. This makes it possible to reduce the number of times of search and increase the speed of packet processing.

In addition, the search of the rule table 24 is not limited to exact match search. In the case of performing longest match search, mask search, or field-specified entry search, it requires more processing time for search by software processing compared with hardware processing. The flow cache table 28 can be implemented by exact match search, and thus can be implemented, for example, by a hash table. The hash search enables faster search, even by software processing, that is equal to hardware processing. In this manner, the flow cache table 28 makes it possible to increase the speed of packet processing by the faster search.

Further, according to the present exemplary embodiment, the packet processing unit 16 performs addition, change or deletion processing with respect to the flow cache table 28 and no other processes access the flow cache table 28. This enables the implementation of the flow cache table 28 in a lockless manner, thereby eliminating standby time due to the mutual exclusion at a time of access by the packet processing unit 16. Therefore, no unnecessary cost due to idle running of the packet processing unit 16 (processor) is generated, and the speed of packet processing is increased.

Other Exemplary Embodiments

In the first exemplary embodiment, when determining that the flow cache table 28 is invalid, the packet processing unit 16 sets the invalid flag of the entry to ON, and actual deletion processing and accompanying update processing on the flow cache table 28 are executed by additional periodic processing.

As another exemplary embodiment, when determining that the flow cache table 28 is invalid, the packet processing unit 16 may delete the entry in a sequential manner.

In addition, in the first exemplary embodiment, when determining that the flow cache table 28 is invalid, the packet processing unit 16 sets the invalid flag of the entry to ON, and actual deletion processing and accompanying update processing on the flow cache table 28 are executed by additional periodic processing.

As another exemplary embodiment, a method of additionally implementing a flow-cache-entry list table is also possible. When adding an entry to the flow cache table 28, the packet processing unit 16 also adds the entry to the flow-cache-entry list table. When determining that the entry is invalid, the packet processing unit 16 sets an invalid flag on the entry in the flow-cache-entry list table rather than the flow cache table 28. This eliminates the need for search of the flow cache table 28 at a time of periodic processing of invalid entry search, making it possible to specify invalid entries without search merely by sequentially referring to the entries in the flow-cache-entry list table in a cross-sectional manner.

The present invention is applicable to the field in which packet processing needs to be implemented by software, such as the Network Functions Virtualization (NFV) or the Software-Defined Networking (SDN), as an example.

The following Preferable embodiments are possible in the present invention.

Preferable Embodiment 1

Preferable embodiment 1 is already described as the packet processing device according to the first aspect.

Preferable Embodiment 2

The packet processing device according to Preferable embodiment 1, wherein
the rule control unit records, when updating rules included in the rule table, an identifier for identifying the update in the storage unit, and
the packet processing unit holds, when accumulating the pointer, an identifier recorded in the storage unit.

Preferable Embodiment 3

The packet processing device according to Preferable embodiment 2, wherein
the packet processing unit compares the held identifier with the identifier recorded in the storage unit by the rule control unit, and thereby determines whether the rule table has been updated by the rule control unit after accumulation of the pointer.

Preferable Embodiment 4

The packet processing device according to Preferable embodiment 2 or 3, wherein
the packet processing unit invalidates the accumulated pointer when the held identifier does not match the identifier recorded in the storage unit by the rule control unit.

Preferable Embodiment 5

The packet processing device according to Preferable embodiment 4, wherein
the packet processing unit specifies an invalidated pointer among the accumulated pointers at a predetermined timing, and deletes the specified pointer.

Preferable Embodiment 6

The packet processing device according to Preferable embodiment 5, wherein
the packet processing unit deletes an invalidated pointer among the accumulated pointers at a predetermined period or at a time of invalidation.

Preferable Embodiment 7

The packet processing device according to Preferable embodiment 6, wherein
the packet processing unit includes:
a flow cache table in which pointers with respect to searched actions are accumulated; and
a flag table in which flags indicating validity of pointers accumulated in the flow cache table, and
when a pointer among the accumulated pointers is invalidated, sets a flag corresponding to the invalidated pointer to invalid in the flag table, and specifies the invalidated pointer by referring to the flag table at the predetermined period.

Preferable Embodiment 8

Preferable embodiment 8 is already described as the packet processing method according to the second aspect.

Preferable Embodiment 9

The packet processing method according to Preferable embodiment 8, wherein
the first process records, when updating rules included in the rule table, an identifier for identifying the update in the storage unit, and
the second process holds, when accumulating the pointer, an identifier recorded in the storage unit.

Preferable Embodiment 10

The packet processing method according to Preferable embodiment 9, wherein
the second process compares the held identifier with the identifier recorded in the storage unit by the first process, and thereby determines whether the rule table has been updated by the first process after accumulation of the pointer.

Preferable Embodiment 11

The packet processing method according to Preferable embodiment 9 or 10, wherein
the second process invalidates the accumulated pointer when the held identifier does not match the identifier recorded in the storage unit by the first process.

Preferable Embodiment 12

Preferable embodiment 12 is already described as the program according to the third aspect.

Preferable Embodiment 13

The program according to Preferable embodiment 12, wherein
the first process records, when updating rules included in the rule table, an identifier for identifying the update in the storage unit, and the second process holds, when accumulating the pointer, an identifier recorded in the storage unit.

Preferable Embodiment 14

The program according to the preferable embodiment 13, wherein
the second process compares the held identifier with the identifier recorded in the storage unit by the first process, and thereby determines whether the rule table has been updated by the first process after accumulation of the pointer.

Preferable Embodiment 15

The program according to Preferable embodiment 13 or 14, wherein
the second process invalidates the accumulated pointer when the held identifier does not match the identifier recorded in the storage unit by the first process.

It should be noted that the disclosure of the above NPLs is incorporated herein in its entirety by reference thereto. Modifications and adjustments of the exemplary embodiments are possible within the scope of the overall disclosure (including the claims) of the present invention and based on the basic technical concept of the present invention. In addition, various combinations and selections of various disclosed elements (including the elements in each of the claims, exemplary embodiments, drawings, etc.) are possible within the scope of the overall disclosure of the present invention. Namely, the present invention of course includes various variations and modifications that could be made by those skilled in the art according to the overall disclosure including the claims and the technical concept. In particular, as for numerical value ranges disclosed herein, even if the description does not particularly disclose arbitrary numerical values or small ranges included in the ranges, these values and ranges should be deemed to have been specifically disclosed.

REFERENCE SIGNS LIST

10 Packet processing device
12 Rule control unit
13 Storage unit
14 Shared memory
16 Packet processing unit
18 Local memory
24 Rule table
26 Action table
28 Flow cache table

The invention claimed is:

1. A packet processing device comprising:
a storage that holds an action table including actions that define processing contents of packets and a rule table including rules to search for actions to be applied to packets;
a rule controller that updates rules included in the rule table; and
a packet processor that searches the action table for an action to be applied to a received packet using the rule table, processes the packet in accordance with the searched action, and accumulates a pointer with respect to the searched action, wherein
the packet processor determines whether the rule table has been updated by the rule controller after accumulation of the pointer and, if not updated, extracts an action to be applied to the received packet from the action table in accordance with the accumulated pointer, wherein
the rule controller records, when updating rules included in the rule table, an identifier for identifying the update in the storage, and
the packet processor holds, when accumulating the pointer, the identifier recorded in the storage.

2. The packet processing device according to claim 1, wherein
the packet processor compares the held identifier with the identifier recorded in the storage by the rule controller, and thereby determines whether the rule table has been updated by the rule controller after accumulation of the pointer.

3. The packet processing device according to claim 2, wherein
the packet processor invalidates the accumulated pointer when the held identifier does not match the identifier recorded in the storage by the rule controller.

4. The packet processing device according to claim 3, wherein
the packet processor specifies an invalidated pointer among the accumulated pointers at a predetermined timing, and deletes the specified pointer.

5. The packet processing device according to claim 4, wherein
the packet processor deletes the invalidated pointer among the accumulated pointers at a predetermined period or at a time of invalidation.

6. The packet processing device according to claim 5, wherein
the packet processor includes:
a flow cache table in which pointers with respect to searched actions are accumulated; and
a flag table in which flags indicating validity of pointers accumulated in the flow cache table, and
when a pointer among the accumulated pointers is invalidated, the flag table sets a flag corresponding to the pointer to invalid in the flag table, and specifies the pointer by referring to the flag table at the predetermined period.

7. The packet processing device according to claim 1, wherein
the packet processor invalidates the accumulated pointer when the held identifier does not match the identifier recorded in the storage by the rule controller.

8. The packet processing device according to claim 7, wherein
the packet processor specifies the invalidated pointer among the accumulated pointers at a predetermined timing, and deletes the specified pointer.

9. The packet processing device according to claim 8, wherein
the packet processor deletes the invalidated pointer among the accumulated pointers at a predetermined period or at a time of invalidation.

10. The packet processing device according to claim 9, wherein
the packet processor includes:
a flow cache table in which pointers with respect to searched actions are accumulated; and
a flag table in which flags indicating validity of pointers accumulated in the flow cache table, and
when a pointer among the accumulated pointers is invalidated, the flag table sets a flag corresponding to the pointer to invalid in the flag table, and specifies the pointer by referring to the flag table at the predetermined period.

11. A packet processing method comprising:

by a computer, holding, in a storage, an action table including actions that define processing contents of packets and a rule table including rules to search for actions to be applied to packets;

updating rules included in the rule table by a first process;

searching, by a second process, the action table for an action to be applied to a received packet using the rule table, processing the packet in accordance with the searched action, and accumulating a pointer with respect to the searched action; and determining, by the second process, whether the rule table has been updated by the first process after accumulation of the pointer and, if not updated, extracting an action to be applied to the received packet from the action table in accordance with the accumulated pointer, wherein the first process records, when updating rules included in the rule table, an identifier for identifying the update in the storage, and the second process holds, when accumulating the pointer, the identifier recorded in the storage.

12. A non-transitory computer readable medium storing a program that causes a computer to execute:

holding, in a storage, an action table including actions that define processing contents of packets and a rule table including rules to search for actions to be applied to packets;

updating rules included in the rule table by a first process;

searching, by a second process, the action table for an action to be applied to a received packet using the rule table, processing the packet in accordance with the searched action, and accumulating a pointer with respect to the searched action; and determining, by the second process, whether the rule table has been updated by the first process after accumulation of the pointer and, if not updated, extracting an action to be applied to the received packet from the action table in accordance with the accumulated pointer, wherein the first process records, when updating rules included in the rule table, an identifier for identifying the update in the storage, and the second process holds, when accumulating the pointer, the identifier recorded in the storage.

* * * * *